(12) United States Patent
Gao et al.

(10) Patent No.: US 10,458,490 B2
(45) Date of Patent: Oct. 29, 2019

(54) CYCLE LOCK SYSTEM AND METHOD

(71) Applicant: GM GLOBAL TECHNOLOGY OPERATIONS LLC, Detroit, MI (US)

(72) Inventors: Zhen Gao, Shanghai (CN); Chengwu Duan, Shanghai (CN); Jian Yao, Shanghai (CN); Chunhao J. Lee, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 273 days.

(21) Appl. No.: 15/665,350

(22) Filed: Jul. 31, 2017

(65) Prior Publication Data

US 2019/0032729 A1 Jan. 31, 2019

(51) Int. Cl.
| | |
|---|---|
| *F16D 41/26* | (2006.01) |
| *B62H 5/08* | (2006.01) |
| *B62M 11/16* | (2006.01) |
| *B62H 5/14* | (2006.01) |
| *B62H 5/00* | (2006.01) |
| *F16D 41/00* | (2006.01) |
| *B62M 11/00* | (2006.01) |

(52) U.S. Cl.
CPC ............... *F16D 41/26* (2013.01); *B62H 5/08* (2013.01); *B62H 5/14* (2013.01); *B62M 11/16* (2013.01); *B62H 5/00* (2013.01); *B62M 11/00* (2013.01); *F16D 41/00* (2013.01)

(58) Field of Classification Search
CPC .......... F16D 41/26; F16D 41/00; F16D 28/00; F16D 2500/102; B62H 5/08; B62H 5/14; B62H 5/00
See application file for complete search history.

(56) References Cited

U.S. PATENT DOCUMENTS

| | | | |
|---|---|---|---|
| 2008/0114519 A1* | 5/2008 | DuFaux ................... | B60T 7/16 701/70 |
| 2011/0183806 A1* | 7/2011 | Wittkopp ................ | F16D 7/028 475/263 |
| 2014/0190785 A1* | 7/2014 | Fetting .................. | F16D 41/125 192/41 R |
| 2016/0298704 A1* | 10/2016 | Itagaki .................... | F16D 23/12 |

* cited by examiner

*Primary Examiner* — Huan Le
(74) *Attorney, Agent, or Firm* — Lorenz & Kopf, LLP

(57) ABSTRACT

Systems and methods are provided for locking a cycle. A clutch system of the cycle includes a forward lock system configured to alternatively prevent or allow operation of the cycle in a forward direction. A shaft extends through the clutch system. An actuator is configured to move the forward lock system along the shaft between a lock position and a free position. A controller is configured to shift the actuator, via a signal from a processor, between the lock position and the free position. The cycle is configured to be locked against forward operation by the clutch system.

20 Claims, 6 Drawing Sheets

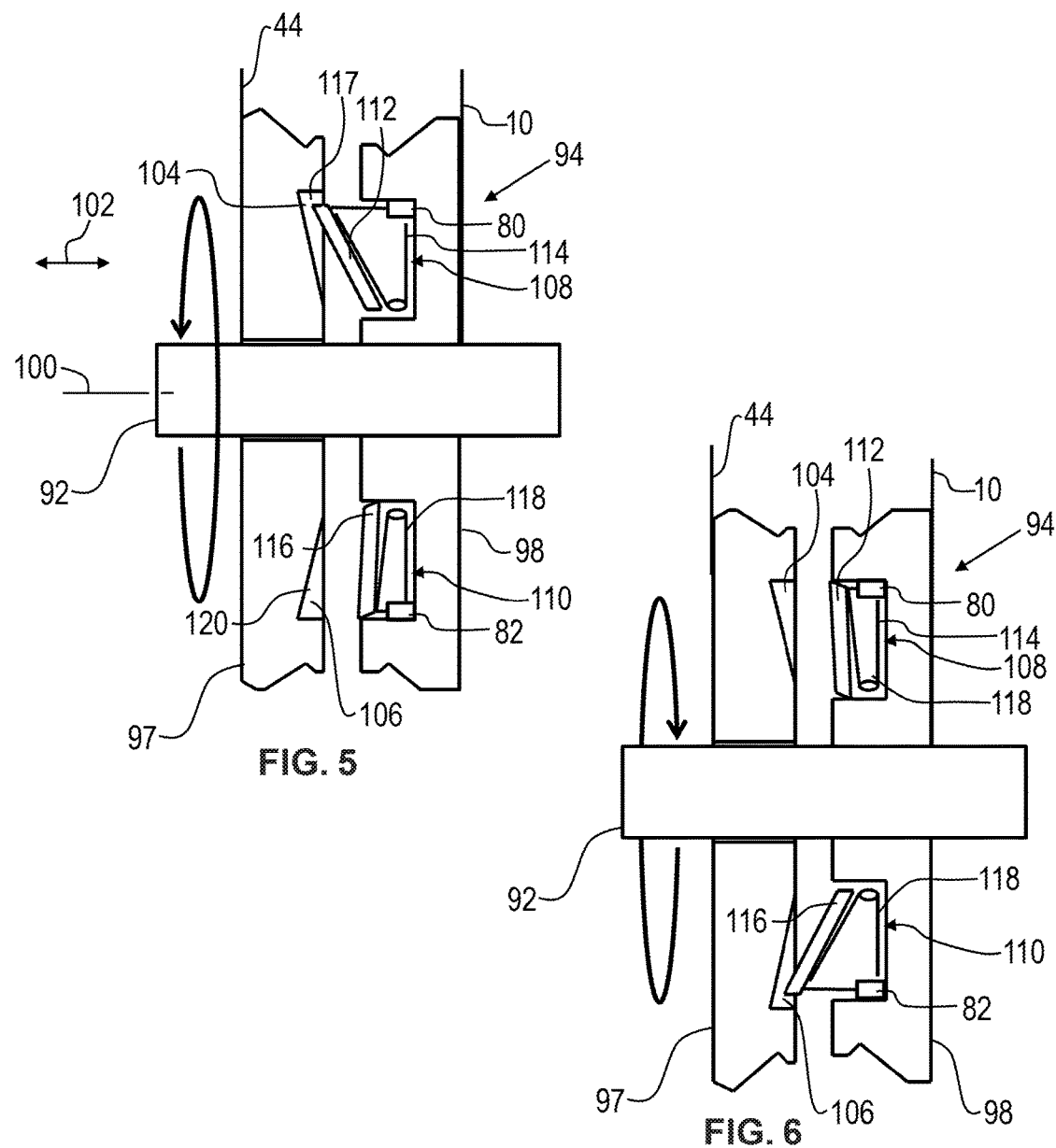

CYCLE LOCK SYSTEM AND METHOD

TECHNICAL FIELD

The present disclosure generally relates to systems and methods for locking cycles, and more particularly relates to locking a cycle using an enclosed clutch system.

INTRODUCTION

Cycles provide an economical method of transportation and are in widespread use. They are propelled through manual pedaling, motorized power, or a combination of the two. Cycles are constructed in a variety of wheel configurations. Two-wheeled cycles are popularly used for sharing, rental and other types of collective use. Typically, for paid uses of cycles, an individual cycle is procured from manned station or a locked rack system. This requires return of the cycle to an affiliated station or rack. Greater flexibility in the paid use of cycles with effective controls to inhibit unpaid use may increase the effectiveness of sharing/rental businesses.

Accordingly, it is desirable to provide systems and methods that support cycle rental where the cycle is procured and securely deposited at a variety of locations. Furthermore, other desirable features and characteristics of the present invention will become apparent from the subsequent detailed description and the appended claims, taken in conjunction with the accompanying drawings and the foregoing technical field and introduction.

SUMMARY

Systems and methods are provided for cycle locking and unlocking. In various embodiments, a lock system for a cycle includes a clutch system with a forward lock system configured to alternatively prevent or allow operation of the cycle in a forward direction. A shaft extends through the clutch system. An actuator is configured to move the forward lock system along the shaft between a lock position and a free position. A controller is configured to shift the actuator, via a signal from a processor, between the lock position and the free position. The cycle is configured to be locked in a default state against operation in the forward direction by the clutch system.

In another embodiment, the lock system includes a communication system coupled with the controller. The processor is configured to respond to the communication system by shifting the actuator.

In another embodiment, the lock system includes a reverse lock system in the clutch system configured to alternatively prevent or allow operation of the cycle in a reverse direction.

In another embodiment of the lock system, the processor is configured to power up the cycle prior to shifting the actuator.

In another embodiment, the lock system includes a unique identifier on the cycle that includes information that identifies the cycle.

In another embodiment of the lock system, the unique identifier is configured to be scanned by a personal electronic device.

In another embodiment of the lock system, the clutch system includes one element fixed to the shaft. Another element is disposed adjacent the first element, with the shaft extending through the element. The forward lock system includes a strut carried by the one element that is configured to alternatively engage or disengage with the other element.

In another embodiment, the lock system includes a spring positioned between the one element and the strut. The spring biases the strut toward the other element.

In another embodiment, the lock system includes a forward lock pocket formed in the other element into which the strut may be positioned to lock the cycle against the forward operation.

In another embodiment of the lock system, the actuator is coupled with the strut.

In other embodiments, a method of locking a cycle includes positioning, by a spring, a forward lock system of a clutch in a locked state that prevents a forward operation of the cycle. Identification of the cycle is determined via a unique identifier. An unlock signal is received by the processor of a controller, to unlock the forward lock system. An actuator signal is delivered by the processor to an actuator of the clutch to move the forward lock system against the spring to a free state that allows forward operation of the cycle.

In another embodiment, the unlock signal is initiated by a server located remote from the cycle.

In another embodiment, the unique identifier is scanned with a personal electronic device obtaining identification data to identify the cycle.

In another embodiment, the identification data is delivered to the server via the personal electronic device.

In another embodiment, identification information of a cycle user is sent to the server via the personal electronic device. The cycle user is identified by the server.

In another embodiment, the unique identifier is scanned with the personal electronic device to end use of the cycle. The forward lock system is positioned in the locked state by the actuator in response to scanning the unique identifier. The server then determines a fee for the use.

In another embodiment, the clutch includes a reverse lock system. The reverse clutch system is positioned in a free state via a signal from the processor, when the forward lock system is in the locked state.

In another embodiment, the unique identifier includes a barcode, which is scanned with a personal electronic device to identify the cycle.

In another embodiment, the personal electronic device communicates with the processor via a communication system on the cycle.

In additional embodiments, a lock system for a cycle includes a clutch system that has a pair of elements alternatively locked together or free to rotate relative to each other. A shaft is fixed to the cycle, and to one of the elements. The other element is rotatable relative to the shaft and includes a forward lock pocket. A strut is carried by the element fixed to the shaft. An actuator is configured to move the strut between a lock position where the strut is positioned in the forward lock pocket and a free position where the strut is retracted from the forward lock pocket. A controller is configured to shift the actuator, via a signal from a processor, between the lock position and the free position. A communication system is coupled with the controller and is receptive of an off-board signal to move the strut from the lock position to the free position. The cycle is configured to be locked against a forward operation by the clutch system, and the forward operation is unlocked by the processor in response to the off-board signal.

BRIEF DESCRIPTION OF THE DRAWINGS

The exemplary embodiments will hereinafter be described in conjunction with the following drawing figures, wherein like numerals denote like elements, and wherein:

FIG. 5 is a schematic, sectional view of a clutch system of the cycle of FIG. 1 in a forward locked, reverse free state, in accordance with various embodiments;

FIG. 6 is a schematic, sectional view of a clutch system of the cycle of FIG. 1 in a forward free, reverse locked state, in accordance with various embodiments;

DETAILED DESCRIPTION

The following detailed description is merely exemplary in nature and is not intended to limit the application or its uses. Furthermore, there is no intention to be bound by any expressed or implied theory presented in the preceding technical field, introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
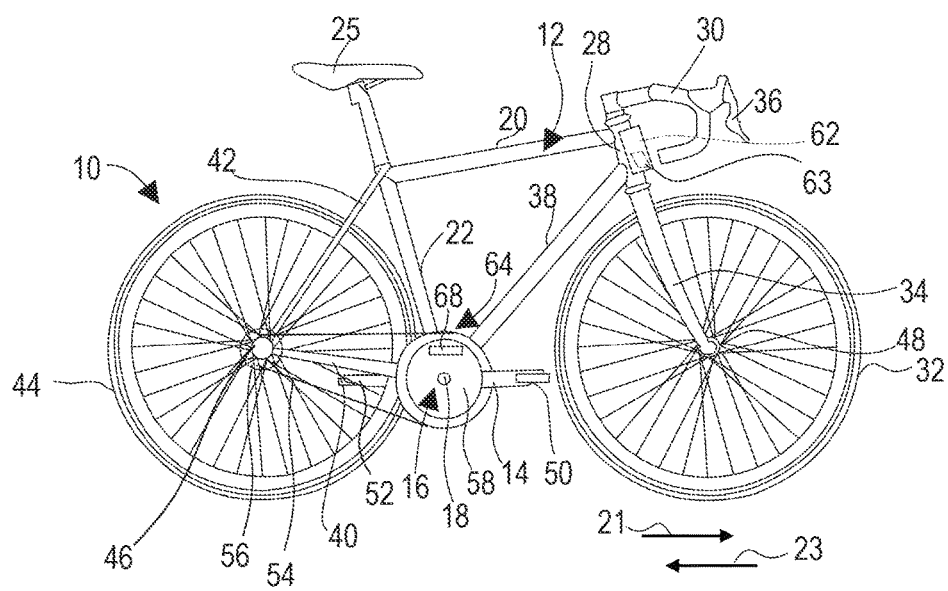
FIG. 1 illustrates a cycle with a lock system in accordance with various embodiments.

FIG. 1 illustrates a cycle 10 according to an exemplary embodiment. In various embodiments, the cycle 10 may be a manually powered cycle, a manually powered cycle with power assist, or an engine/motor powered cycle of various wheel configurations. The cycle 10 is configured to normally operate in a forward direction 21. A reverse direction 23 is directed opposite the forward direction 21. The cycle 10 is configured with forward operation lockout, making it amenable for use in sharing or rental fleets where random point use is allowed. In a number of embodiments, the cycle 10 is also configured with reverse operation lockout. In general, the cycle 10 includes a frame 12 which may include a top tube 20 connected to a seat tube 22. A seat assembly 25 is connected with the seat tube 22. A steering tube 28 may extend from the top tube 20. A down tube 38 may extend between the seat tube 22 and the steering tube 28. The steering tube 28 is operatively connected to a front fork 34 which is attached to a front wheel 32 via a front axle assembly 48. Handlebars 30 are attached to the front fork 34 and are used to control the direction of the front wheel 32. The handlebars 30 and the front fork 34 are connected to the frame 12 at the steering tube 28. Control levers 36 may be provided on the handlebars 30 and are constructed and arranged to communicate with one or more controlled devices such as brakes (not shown). A chain stay 40 and a seat stay 42 extend rearward from the seat tube 22 and support a rear wheel 44 on a rear axle assembly 46.

The cycle 10 includes a propulsion system 16. In a number of embodiments, the propulsion system 16 includes a crank assembly 14 which includes a crankshaft 18 that may be connected with a pair of pedal assemblies 50, 52. A chain 54 is operatively connected between the propulsion system 16 and a hub 56 of the rear wheel 44. In a number of embodiments, the propulsion system 16 includes a drive unit 58 powered by an electric motor 60. The drive unit 58 may provide propulsion assistance to the crank assembly 14. In some embodiments, the drive unit 58 may be the sole power source for propelling the cycle 10. The cycle 10 includes a unique identifier 62, which may be a in the form of a barcode 63 such as a matrix barcode. In other embodiments, the unique identifier 62 is a serial number, an electronic chip, or another mechanism that is readable manually and/or electronically. The unique identifier 62 enables identification of the individual cycle 10 so that it may be distinguished from other cycles.

Figure 2:
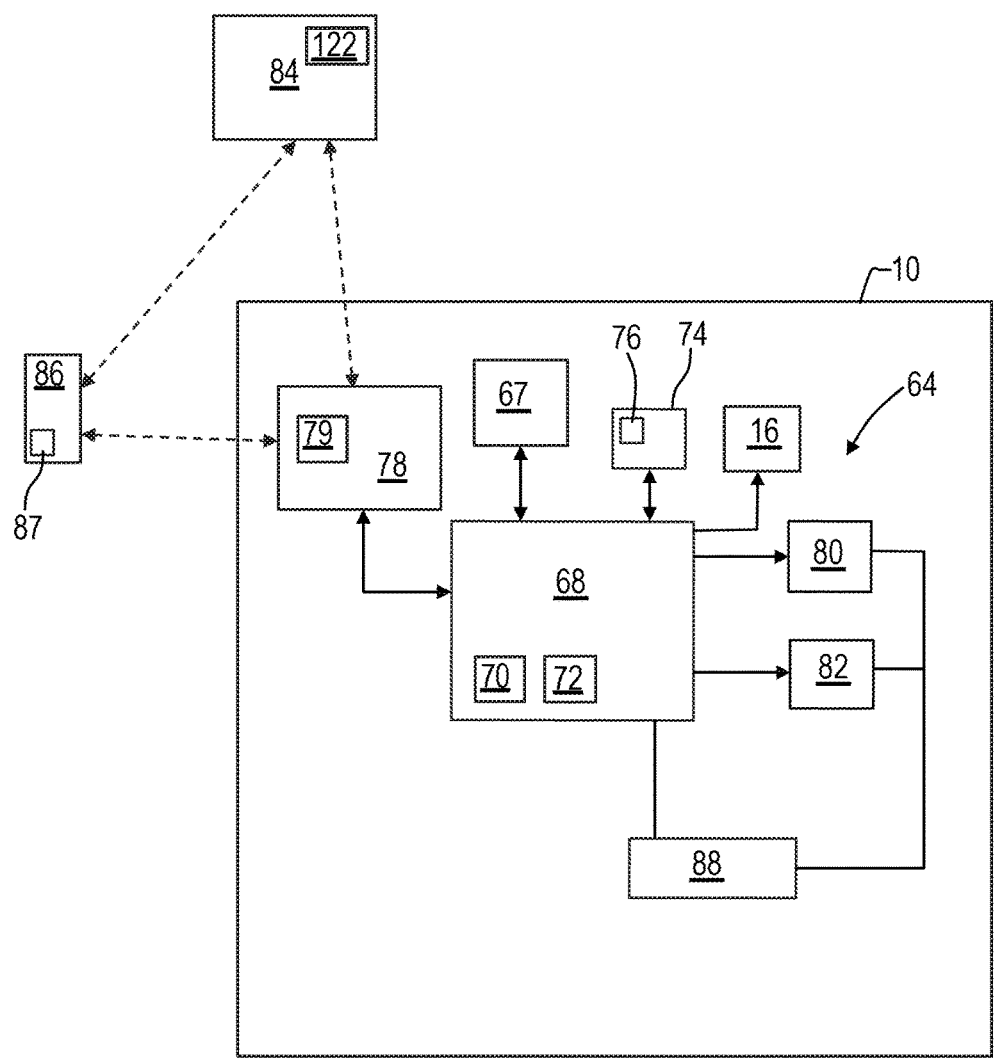
FIG. 2 is a block diagram illustrating the cycle of FIG. 1 with a cycle lock system employing methods, in accordance with various embodiments.

In the embodiment of FIG. 1, the cycle 10 includes a controller 68. In general, the controller 68 accepts information from various sources, process that information, and provide control commands based thereon to effect outcomes such as operation of the vehicle propulsion system 16 and other systems, including a cycle lock system 64. With additional reference to FIG. 2, in the depicted embodiment, the controller 68 includes a processor 70, a memory device 72, and is coupled with a storage device 74. The controller 68 may receive signals from various sensors 67 of the cycle 10 supplying information used in controlling one or more systems. The processor 70 performs the computation and control functions of the controller 68, and may comprise any type of processor or multiple processors, single integrated circuits such as a microprocessor, or any suitable number of integrated circuit devices and/or circuit boards working in cooperation to accomplish the functions of a processing unit. During operation, the processor 70 executes one or more programs 76 that may be contained within the storage device 74 and, as such, controls the general operation of the controller 68, generally in executing the processes described herein, such as the process 200 described further below in connection with FIG. 9.

The memory device 72 may be any type of suitable memory. For example, the memory device 72 may include volatile and nonvolatile storage in read-only memory (ROM), random-access memory (RAM), and keep-alive memory (KAM), for example. KAM is a persistent or non-volatile memory that may be used to store various operating variables while the processor 70 is powered down. The memory device 72 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 68. In certain examples, the memory device 72 is located on and/or co-located on the same computer chip as the processor 70.

In the depicted embodiment, the storage device 74 stores the above-referenced programs 76 along with other information. The storage device 74 stores data for use in automatically controlling systems of the cycle 10. The storage device 74 may be any suitable type of storage apparatus, including direct access storage devices such as hard disk drives, flash systems, floppy disk drives and optical disk drives. In one exemplary embodiment, the storage device 74 comprises a source from which the memory device 72 receives the programs 76 that execute one or more embodiments of one or more processes of the present disclosure, such as the steps of the process 200 (and any sub-processes thereof) described further below in connection with FIG. 9. In another exemplary embodiment, the programs 76 may be directly stored in and/or otherwise accessed by the memory device 72. The programs 76 represent executable instructions, used by the electronic controller 68 in processing information and in controlling the cycle 10, including the cycle lock system 64. The instructions may include one or more separate programs, each of which comprises an ordered listing of executable instructions for implementing logical functions. The instructions, when executed by the processor 70 support the receipt and processing of signals such as from sensors, perform logic, calculations, methods and/or algorithms for automatically controlling the components and systems of the cycle 10. The processor 70 may generate control signals such as for the drive unit 58 and/or the cycle lock system 64 based on the logic, calculations, methods, and/or algorithms.

The controller 68 is coupled with a communication system 78 for sending and receiving information. A user's personal electronic device (PED) 86 is used to communicate with a remote server 84, such as via the internet, using an application (app) 87 created for the sharing/rental service that manages use of the cycle 10. In the current embodiment, the communication system 78 includes a communication module 79. The communication module 79 enables connection between the cycle locking system 64 and the PED 86 using a short-range wireless transmission protocol. In a number of embodiments, the communication module 79 enables connection between the cycle locking system 64 and the internet without use of the PED 86, and may operate using low-power 2G cellular, low-power wide area networking, or other available communication protocol. The communication module 79 enables communication of information between the cycle locking system 64 and a remote server 84, either directly or through the PED 86. In the exemplary embodiment, the controller 68 is coupled with a forward lock actuator 80 and a reverse lock actuator 82. The controller 68 effects locking and unlocking of the cycle locking system 64, which may be in response to commands received from the remote server 84 as further described below in relation to FIG. 9.

The cycle locking system 64 includes a power source 88, which may include a battery, capacitor, or another source. While the components of the cycle lock system 64 are depicted as being part of the same system, it will be appreciated that in certain embodiments these features may comprise multiple systems. In addition, in various embodiments the cycle lock system 64 may comprise all or part of, and/or may be coupled to, various other cycle devices and systems, such as, among others, the propulsion system 16, and/or one or more other systems of the cycle 10.

Figure 3:
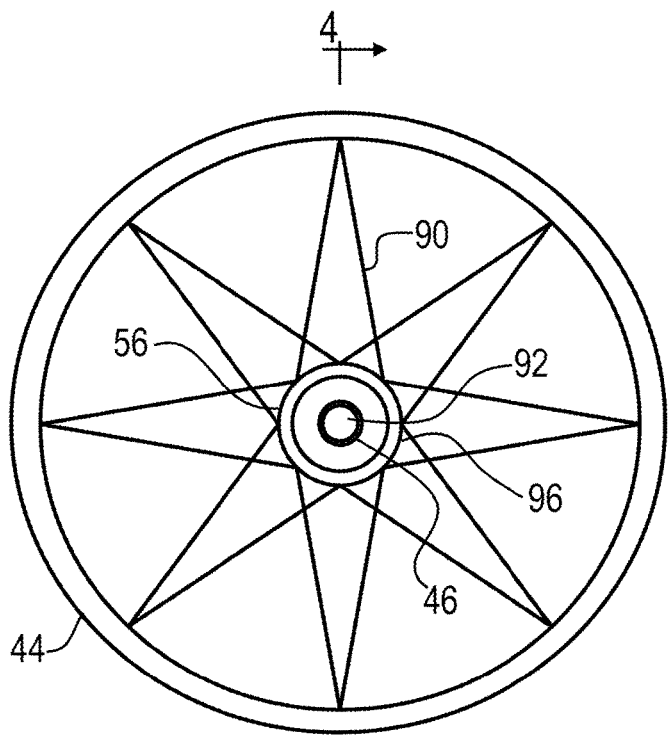
FIG. 3 is a schematic illustration of a wheel and axle assembly of the cycle of FIG. 1, in accordance with various embodiments.
Figure 4:
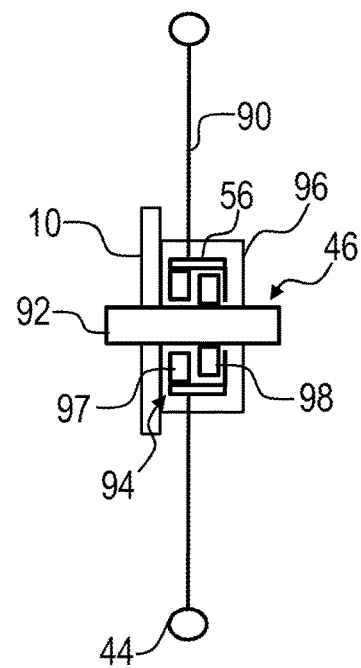
FIG. 4 is a schematic cross section illustration of the wheel and axle assembly of FIG. 3 taken generally through the line indicated as 4-4 in FIG. 3.
Figure 7:
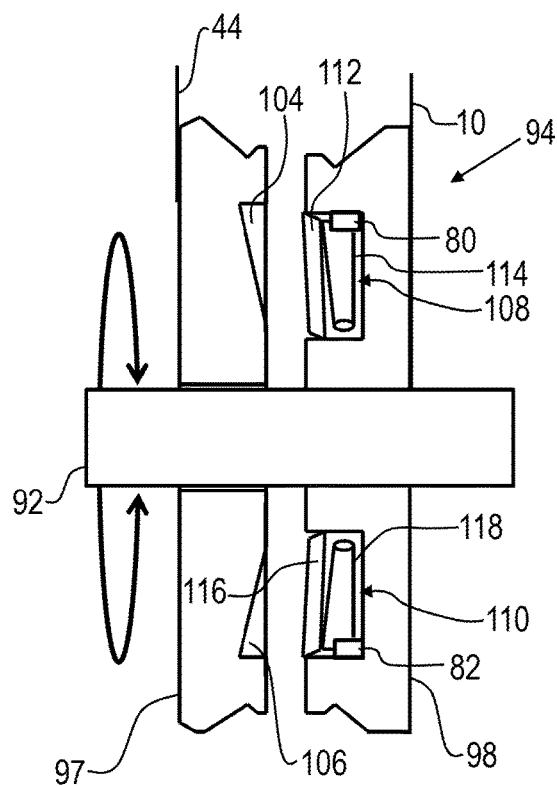
FIG. 7 is a schematic, sectional view of a clutch system of the cycle of FIG. 1 in a forward free, reverse free state, in accordance with various embodiments.
Figure 8:
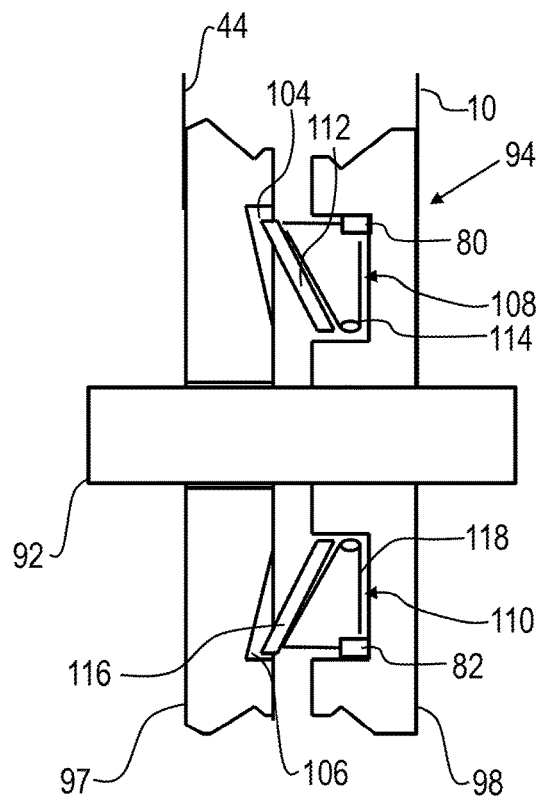
FIG. 8 is a schematic, sectional view of a clutch system of the cycle of FIG. 1 in a forward locked, reverse locked state, in accordance with various embodiments.

Locking and unlocking of the cycle 10 may be effected at various rotating locations such at the rear axle assembly 46, the crankshaft 18, or the front axle assembly 48. With reference to FIGS. 3 and 4, an example of the use of the rear axle assembly 46 for locking and unlocking is described in greater detail. The rear wheel 44 includes a number of spokes 90 supporting the rear wheel 44 on the rear hub 56. The axle assembly 46 includes an axle shaft 92 non-rotationally fixed to the cycle 10. The rear hub 56 houses a clutch system 94 in a case 96. The clutch system 94 includes a rotating element 97 that rotates with the rear wheel 44 and a fixed element 98 that is fixed to the cycle 10 such as through the axle shaft 92. For the rear wheel 44 to rotate, the rotating element 97 rotates relative to the fixed element 98. Enclosing the clutch system 94 within the case 96 increases the level of difficulty needed to circumvent the cycle locking system 64, making such efforts less feasible to undertake. It should be understood that the clutch system 94 may similarly be used at the axle assembly 48 of the front wheel 32. The clutch system 94 may be used at the crankshaft 18, with the rotating element 97 fixed to rotate with the crankshaft 18 and the fixed element 98 non-rotationally fixed to the cycle 10. As further described below, the clutch system 94 employs one-way clutch elements, locking pawls, or similar devices to provide bi-directional, free and locked states between the rotating element 97 and the fixed element 98.

Referring to FIGS. 5-8, the exemplary clutch system 94 includes the rotating element 97 to which the rear wheel 44 is fixed so that the two rotate together. The rotating element 97 and the rear wheel 44 rotate around an axis 100 defined through the center of the axle 92. The axis 100 defines an axial direction 102 which extends parallel with the axis 100. The rotating element 97 includes a number of forward lock pockets 104 and a number of reverse lock pockets 106, that open facing in the axial direction 102 toward the fixed element 98. The fixed element 98 is fixed to the axle shaft 92, which is fixed to the cycle 10. The fixed element 98 includes a forward lock system 108 and a reverse lock system 110. The forward lock system 108 includes a number of struts 112 movable by an actuator 80. Each strut 112 is biased by a spring 114 toward the position of FIG. 5 where the strut 112 is positioned in the forward lock pocket 104. As a result, attempted rotation of the rear wheel 44 in the forward direction results in engagement between the strut 112 with a stop 117, which prevents forward rotation of the rear wheel 44. The reverse lock system 110 includes a number of struts 116 movable by an actuator 82. Each strut 116 is biased by a spring 118 toward the position of FIG. 5 where the strut 116 is withdrawn from, and is positioned outside of, the reverse lock pocket 106. As a result, attempted rotation of the rear wheel 44 in the reverse direction 23 results in no engagement between the strut 116 with a stop 120, which allows reverse rotation of the rear wheel 44. FIG. 5 illustrates the clutch system 94 in a default mode which in this case is lock-free, meaning the wheel 44 is locked in the forward direction and is freewheeling in the reverse direction. It should be understood that when the clutch system 94 is employed at the crankshaft 18 the default mode is free-lock, meaning that upon attempted forward pedaling of the crank assembly 14, the crankshaft 18 freewheels and will not propel the cycle 10.

The actuators 80, 82 are configured to place the clutch system 94 in a number of states including the default state locked-free of FIG. 5. The actuators 80, 82 may employ solenoids, fluid power cylinders, mechanical linkages, linear actuators, motors or other mechanisms, and may use actuator rings (not shown), to operate multiple struts simultaneously. The default state of FIG. 5 provides a security mechanism where operation of the cycle 10 in the forward direction 21 is not possible and therefore, unauthorized use of the cycle 10 is discouraged. The actuators 80, 82 are configured to place the clutch system 94 in a free-lock state of FIG. 6 where the strut 116 is positioned in the reverse lock pocket 106 and the strut 112 is withdrawn from, and is positioned outside of, the forward lock pocket 104. This state coincides with a normal operation state of the cycle 10 where the rear wheel 44 is free to turn in the forward direction 21 and is locked in the reverse direction 23, so that force on the pedals results in resistance. The actuators 80, 82 are configured to place the clutch system 94 in a free-free state of FIG. 7 where the strut 116 is positioned outside the reverse lock pocket 106 and the strut 112 is positioned outside the forward lock pocket 104. This allows the rear wheel to freewheel in both the forward direction 21 and in the reverse direction 23. Freewheeling in reverse is preferable is some operating options where reverse rolling of the cycle 10 is desired. The actuators 80, 82 are configured to place the clutch system 94 in a locked-locked state of FIG. 8 where the strut 116 is positioned in the reverse lock pocket 106 and the strut 112 is positioned in the forward lock pocket 104. This prevents the rear wheel 44 from rotating in both the forward direction 21 and in the reverse direction 23. This mode provides added security where the cycle 10 cannot roll in either the forward direction 21 or the reverse direction 23.

Figure 9:
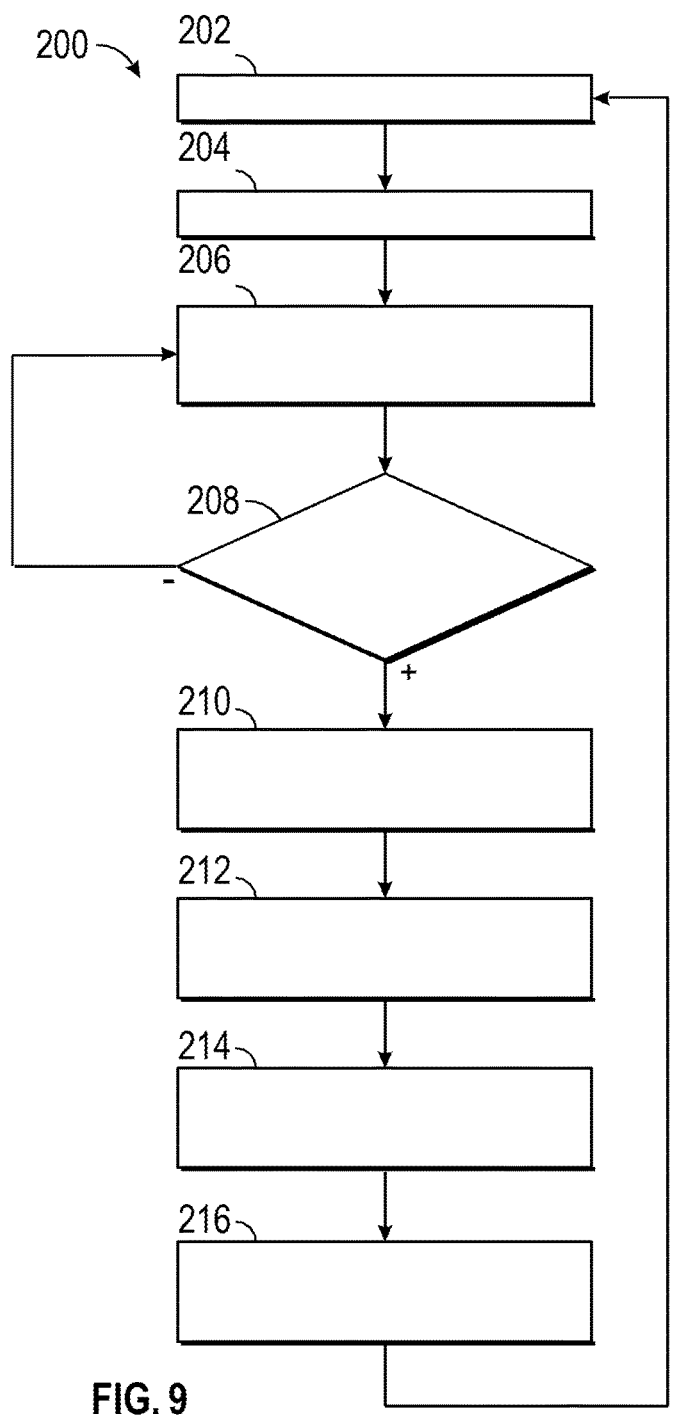
FIG. 9 is a flowchart illustrating a process employing cycle locking methods for the cycle of FIG. 1, in accordance with various embodiments.

In an exemplary embodiment, FIG. 9 illustrates a flowchart of a process 200 for the cycle locking system 64 of the cycle 10. The process 200 is implemented in connection with the cycle 10, including the cycle locking system 64 and other systems, sub-systems, and components thereof, including those illustrated in FIGS. 1-8, in accordance with the exemplary embodiment. In various embodiments, one or more instructions may be embodied in the controller 68 and/or the storage device 76 and, when executed by the processor 70, effect operation of the cycle lock system 64. The process 200 begins at step 202 with the cycle user locating the cycle 10 for use. Proceeding to step 204, with the clutch system 94 in the free-locked state of FIG. 5 when the cycle 10 is first located and not in use. At the step 204 the user of the cycle 10 has registered with the sharing/rental service and loaded the service's app 87 on their PED 86. This includes arranging for payment, which may include using a mobile pay system, a credit card, electronic currency, or other payment mechanism. The process 200 uses time based payment terms where the cycle user is charged for the time they occupy the cycle 10. In other embodiments, other payment terms may be used. The accepted payment mechanism may be pulled by the server 84 from the PED 86 per use, or may be securely stored on the server 84 with the cycle user's account. Proceeding to step 206, the cycle user enters the unique identifier 62 using their PED 86 and engages the server 84 through the app 87. In the current embodiment this entails scanning the unique identifier 62 in the form of a matrix barcode, and transmitting identifying information on the cycle 10 from the PED 86 to the server 84. At step 208, a determination is made by the server 84 as to whether the cycle 10 is identified and the cycle user is identified as a valid user. When the determination is negative and the cycle 10 is not identified or the cycle user is not a valid user, the process returns to step 206.

When a positive determination is made at step 208, meaning the cycle 10 is identified and the cycle user is identified as a valid user, the process proceeds to step 210 and, by the processor 70, the cycle 10 is powered up drawing power from the power source 88. The clutch lock system 64 is then shifted to the forward mode of FIG. 6 for operation by the cycle user. Shifting is effected through signals from the controller 68 to the actuators 80, 82. The processor 70 is enabled to take these actions by the server 84 through the communication system 78. Authorization is delivered to the processor 70 through the PED 86 using the short-range wireless transmission protocol, or alternatively, through the low-power 2G cellular/low-power wide area networking link between the communication system 78 and the server 84. The process 200 proceeds to step 212 where the processor 70 maintains the actuators 80, 82 in the locked, free states of FIG. 6 and a timer 122 records the time that the cycle 10 is in use. When the cycle user has completed use of the cycle 10, the process 200 proceeds to step 214 where the cycle user ends use through the app 87. In the exemplary embodiment, the cycle user scans the matrix barcode of the unique identifier 62. The processor 70 returns the clutch system 94 to the locked-free state of FIG. 5 through signals to the actuators 80, 82, and powers down the cycle 10. At step 216, the server 84 records the time from the timer 122 and charges the cycle user's account for the applicable fee. The server 84 sends a receipt message to the PED 86 through the app 87, and the process 200 ends.

Accordingly, when a user confirms identification for use of the cycle 10, the cycle lock system is unlocked and remains unlocked until the user confirms the end of use of the cycle 10. In each case confirmation is accomplished through the app 87, in the exemplary embodiment through scanning of the unique identifier 62. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. A lock system for a cycle comprising:
a clutch system of the cycle including a forward lock system including at least one strut engageable with a stop and configured to alternatively prevent or allow operation of the cycle in a forward direction;
a shaft extending through the clutch system;

an actuator configured to move the forward lock system along the shaft between a lock position and a free position; and a controller configured to shift the actuator, via a signal from a processor, between the lock position and the free position;

wherein the cycle is configured to be locked in a default state against operation in the forward direction by the clutch system.

2. The lock system of claim 1 comprising a communication system coupled with the controller and the processor configured to respond to the communication system by shifting the actuator.

3. The lock system of claim 1 comprising a reverse lock system in the clutch system configured to alternatively prevent or allow operation of the cycle in a reverse direction.

4. The lock system of claim 1 wherein the processor is configured to power up the cycle prior to shifting the actuator.

5. The lock system of claim 1 comprising:
a unique identifier on the cycle including information that identifies the cycle.

6. The lock system of claim 5 wherein the unique identifier is configured to be scanned by a personal electronic device.

7. The lock system of claim 1 wherein the clutch system comprises:
a first element fixed to the shaft; and
a second element disposed adjacent the first element, the shaft extending through the second element;
wherein the strut is carried by the first element and configured to alternatively engage or disengage with the second element.

8. The lock system of claim 7 comprising a spring positioned between the first element and the strut, the spring biasing the strut toward the second element.

9. The lock system of claim 8 comprising a forward lock pocket formed in the second element into which the strut is positionable to lock the cycle against the forward operation.

10. The lock system of claim 9 wherein the actuator is coupled with the strut.

11. A method of locking a cycle comprising:
positioning, by a spring, a strut of a forward lock system of a clutch against a stop in a locked state that prevents a forward operation of the cycle;
determining, via a unique identifier, an identification of the cycle;
receiving, by a processor of a controller, an unlock signal to unlock the forward lock system; and
delivering, by the processor, an actuator signal to an actuator of the clutch to move the strut of the forward lock system against the spring to a free state off the stop that allows the forward operation of the cycle.

12. The method of claim 11 wherein the unlock signal is initiated by a server located remote from the cycle.

13. The method of claim 12 comprising scanning the unique identifier with a personal electronic device obtaining identification data to determine the identification of the cycle.

14. The method of claim 13 comprising delivering, via the personal electronic device, the identification data to the server.

15. The method of claim 14 comprising:
sending to the server, via the personal electronic device, identification information of a cycle user; and
determining, via the server, an identification of the cycle user.

16. The method of claim 15 comprising:
scanning the unique identifier with the personal electronic device to end a use of the cycle;
positioning, via the actuator, the forward lock system in the locked state in response to scanning the unique identifier; and
determining, by the server, a fee for the use.

17. The method of claim 11 wherein the clutch includes a reverse lock system and comprising positioning, via a signal from the processor, the reverse lock system in a free state when the forward lock system is in the locked state.

18. The method of claim 11, wherein the unique identifier includes a barcode and comprising scanning the barcode with a personal electronic device to determine the identification of the cycle.

19. The method of claim 18 comprising communicating between the personal electronic device and the processor via a communication system on the cycle.

20. A lock system for a cycle comprising:
a clutch system of the cycle including a first element and a second element alternatively locked together or free to rotate relative to each other;
a shaft fixed to the cycle, wherein the first element is fixed to the shaft and wherein the second element is rotatable relative to the shaft wherein a forward lock pocket is formed in the second element and a strut is carried by the first element;
an actuator configured to move the strut between a lock position where the strut is positioned in the forward lock pocket and a free position where the strut is retracted from the forward lock pocket;
a controller configured to shift the actuator, via a signal from a processor, between the lock position and the free position; and
a communication system coupled with the controller and receptive of an off-board signal to move the strut from the lock position to the free position;
wherein the cycle is configured to be locked against a forward operation by the clutch system and the forward operation is unlocked by the processor in response to the off-board signal.

* * * * *